(12) United States Patent
Moriwaki et al.

(10) Patent No.: US 9,909,936 B2
(45) Date of Patent: Mar. 6, 2018

(54) HEAT FLUX SENSOR AND METHOD FOR MANUFACTURING SAME

(71) Applicant: MITSUBISHI HEAVY INDUSTRIES, LTD., Tokyo (JP)

(72) Inventors: Atsushi Moriwaki, Tokyo (JP); Shinsuke Tajiri, Tokyo (JP); Kazuhiro Kamaya, Tokyo (JP); Masanori Tsubouchi, Tokyo (JP); Tsubasa Saito, Tokyo (JP); Kazuhiro Yamada, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 378 days.

(21) Appl. No.: 14/443,162

(22) PCT Filed: Dec. 25, 2013

(86) PCT No.: PCT/JP2013/084624
§ 371 (c)(1),
(2) Date: May 15, 2015

(87) PCT Pub. No.: WO2014/104077
PCT Pub. Date: Mar. 7, 2014

(65) Prior Publication Data
US 2015/0292961 A1 Oct. 15, 2015

(30) Foreign Application Priority Data
Dec. 27, 2012 (JP) .................. 2012-285917

(51) Int. Cl.
*G01K 17/08* (2006.01)
*G01K 17/20* (2006.01)

(52) U.S. Cl.
CPC ............. *G01K 17/08* (2013.01); *G01K 17/20* (2013.01)

(58) Field of Classification Search
CPC .............................. G01K 17/08; G01K 17/20
See application file for complete search history.

(56) References Cited

U.S. PATENT DOCUMENTS 3,267,726 A * 8/1966 Sellers, Jr. ............. G01K 17/00
374/30
3,996,070 A * 12/1976 Fletcher ................. G01K 1/143
136/232

(Continued)

FOREIGN PATENT DOCUMENTS

JP 49-74274 6/1974
JP 63-105853 7/1988

(Continued)

OTHER PUBLICATIONS

International Search Report dated Apr. 8, 2014 in corresponding International Application No. PCT/JP2013/084624.

(Continued)

*Primary Examiner* — Lisa Caputo
*Assistant Examiner* — Philip Cotey
(74) *Attorney, Agent, or Firm* — Wenderoth, Lind & Ponack, L.L.P.

(57) ABSTRACT

A heat flux sensor to be attached to a hole portion defined in a surface of an object includes a body portion having an outer circumferential face, and an exterior end face that is flush with the surface of the object. The body portion includes a plurality of bored holes extending from an outer face other than the exterior end face of the body portion, with respective tips of the bored holes being arranged on the same normal line of the exterior end face. The heat flux sensor further includes a plurality of heat sensors having wiring lines leading to the outer face of the body portion through the bored holes, and a filling material that fills the bored holes to seal the heat sensors.

8 Claims, 4 Drawing Sheets

(56) References Cited

U.S. PATENT DOCUMENTS

| | | | | |
|---|---|---|---|---|
| 4,778,538 | A * | 10/1988 | Lyman | G01K 13/02 136/221 |
| 4,904,091 | A * | 2/1990 | Ward | G01K 1/14 136/230 |
| 4,916,715 | A * | 4/1990 | Adiutori | G01N 25/18 374/1 |
| 5,048,973 | A * | 9/1991 | Liebert | G01K 17/20 136/200 |
| 5,086,204 | A * | 2/1992 | Liebert | G01K 17/20 219/69.17 |
| 5,697,706 | A * | 12/1997 | Ciaravino | G01K 3/14 374/166 |
| 5,772,329 | A * | 6/1998 | Bardon | G01K 17/20 374/166 |
| 5,999,081 | A * | 12/1999 | Hannigan | G01K 1/10 338/229 |
| 6,485,174 | B1 * | 11/2002 | Albrecht | G01K 17/08 374/147 |
| 6,550,963 | B2 * | 4/2003 | Daily | G01K 7/04 136/201 |
| 2004/0136434 | A1 * | 7/2004 | Langley | G01K 17/20 374/29 |
| 2009/0262777 | A1 * | 10/2009 | Sakami | G01B 21/085 374/7 |

FOREIGN PATENT DOCUMENTS

| | | |
|---|---|---|
| JP | 2-133640 | 11/1990 |
| JP | 5-164626 | 6/1993 |
| JP | 7-146189 | 6/1995 |
| JP | 10-274629 | 10/1998 |
| JP | 2003-130737 | 5/2003 |
| JP | 2007-271456 | 10/2007 |

OTHER PUBLICATIONS

Written Opinion of the International Searching Authority dated Apr. 8, 2014 in corresponding International Application No. PCT/JP2013/084624 (with English translation).

\* cited by examiner

HEAT FLUX SENSOR AND METHOD FOR MANUFACTURING SAME

CROSS-REFERENCE TO RELATED APPLICATION

Priority is claimed from Japanese Patent Application No. 2012-285917, filed Dec. 27, 2012, the content of which is incorporated herein by reference.

TECHNICAL FIELD

The present invention relates to a heat flux sensor that measures heat flux that is the quantity of heat that crosses the unit area of an object to be measured in unit time, and a method for manufacturing the heat flux sensor.

BACKGROUND ART

For example, at the tip of a flying object that advances at ultra-high speed, it is known that aerodynamic heating occurs due to shock waves, the temperature rises, and the tip is exposed to a high temperature. When design, development, combustion analysis, soundness evaluation, and the like are performed regarding such a region, it is important to precisely grasp surface heat flux.

As a heat flux sensor for measuring a temperature situation, a technique of attaching a rod-shaped member in which two thermocouples are embedded in a region to be measured is known (for example, refer to Japanese Unexamined Patent Application, First Publication No. H10-274629).

Technical Problem

Meanwhile, when the heat flux is measured by the above-described method, there is a problem in that a heat flux error occurs if fixation of the two thermocouples onto the wall surface of the object to be measured is not precisely performed. That is, hot junctions of the two thermocouples are not arranged on the same normal line of predetermined positions of the wall surface, and attachment positions deviate, whereby a heat flux error occurs easily.

However, in the case of the method that embeds the thermocouples as in the above-described heat flux sensor, there is a problem in that management of the positions of the two thermocouples is difficult.

SUMMARY OF INVENTION

An object of the invention is to provide a heat flux sensor that can prevent occurrence of heat flux errors caused by thermometer-side positional deviation, and a method for manufacturing the heat flux sensor.

Technical Solution

According to a first aspect of the present invention, a heat flux sensor is a heat flux sensor capable of being attached to a hole portion formed in the surface of an object to be measured. The heat flux sensor includes a body portion having an outer circumferential face that faces an inner circumferential face of the hole portion, and an exterior end face being flush with the surface of the object to be measured. The body portion is formed with a plurality of bored holes that extends from an outer face other than the exterior end face of the body portion toward the inside of the body portion, and respective tips of which arranged on the same normal line of the exterior end face. The heat flux sensor further includes a plurality of heat sensors that are arranged so as to abut against the tips of the respective bored holes and that have wiring lines leading to the outer face of the body portion through the bored holes and a filling material that fills the bored holes to seal the heat sensors inside the bored holes.

According to the above configuration, since a configuration is provided in which the heat sensors are arranged in the bored holes formed in advance and the heat sensors are filled with the filling material, occurrence of heat flux errors caused by thermometer-side positional deviation can be prevented.

Additionally, since a configuration is provided in which the body portion fixed to the plurality of is attached to the hole portion of the object to be measured, the arrangement of the heat sensors to the object to be measured becomes easy.

In the above-mentioned heat flux sensor, a configuration may be adopted in which three or more of the heat sensors are provided.

According to the above configuration, when the temperature of the object to be measured is in an unsteady state, the heat flux errors can be reduced by calculating heat flux based on the temperatures at three or more points.

In the above heat flux sensor, a configuration may be adopted in which the body portion is formed in a columnar shape, and the tips of the heat sensors are arranged on a central axis of the body portion.

According to the above configuration, since the positions of the heat sensors can be determined based on the depths of the bored holes, positioning of the heat sensors becomes easy.

In the above heat flux sensor, a configuration may be adopted in which a gap between the heat flux sensor and the hole portion is filled with a filling material.

According to the above configuration, since a temperature difference between the body portion and the object to be measured becomes smaller, the heat flux error can be reduced.

In the above heat flux sensor, a configuration may be adopted in which the bored holes are provided at equal intervals in a circumferential direction of the body portion.

According to the above configuration, since balance in the circumferential direction in the internal structure of the body portion is improved, the heat flux error can be further reduced.

In the above heat flux sensor, a configuration may be adopted in which a cylindrical pipe portion provided so as to cover the outer circumferential face of the body portion is further included, and a gap between the body portion and the pipe portion is filled with a filling material.

According to the above configuration, since grooves for wiring lines formed in the outer circumferential face of the body portion are covered with the pipe portion, the attachment of the body portion to the object to be measured becomes easy.

In the above heat flux sensor, a configuration may be adopted in which the materials of the body portion and the pipe portion are the same as that of the object to be measured.

According to the above configuration, error influence caused by the heat conduction between the object to be measured, and the body portion and the pipe portion can be reduced.

In the heat flux sensor, a configuration may be adopted in which an oxide film is formed on the exterior end face.

According to the above configuration, since the state of the exterior end face of the body portion becomes the same state as the surface of the object to be measured, the heat flux error can be further reduced.

Additionally, the present invention provides a method for manufacturing a heat flux sensor. The method includes a step of forming a hole portion in the surface of an object to be measured; a step of forming a body portion having an outer circumferential face that faces an inner circumferential face of the hole portion and an exterior end face flush with the surface of the object to be measured; a step of forming the body portion with a plurality of bored holes that extends from an outer face other than the exterior end face of the body portion toward the inside of the body portion, and respective tips of which are arranged on the same normal line of the exterior end face; a step of arranging a plurality of heat sensors so as to abut against the tips of the respective bored holes and laying wiring lines so as to lead to the outer face of the body portion through the bored holes; and a step of filling the insides of the bored holes with a filling material so as to seal the heat sensors.

Advantageous Effects of Invention

According to the present invention, since a configuration is provided in which the heat sensors are arranged in the bored holes formed in advance and the heat sensors are fixed by the filling material, the occurrence of a heat flux error caused by thermometer-side positional deviation can be prevented.

DESCRIPTION OF EMBODIMENTS

Hereinafter, an embodiment of the present invention will be described in detail with reference to the drawings.

Figure 1:
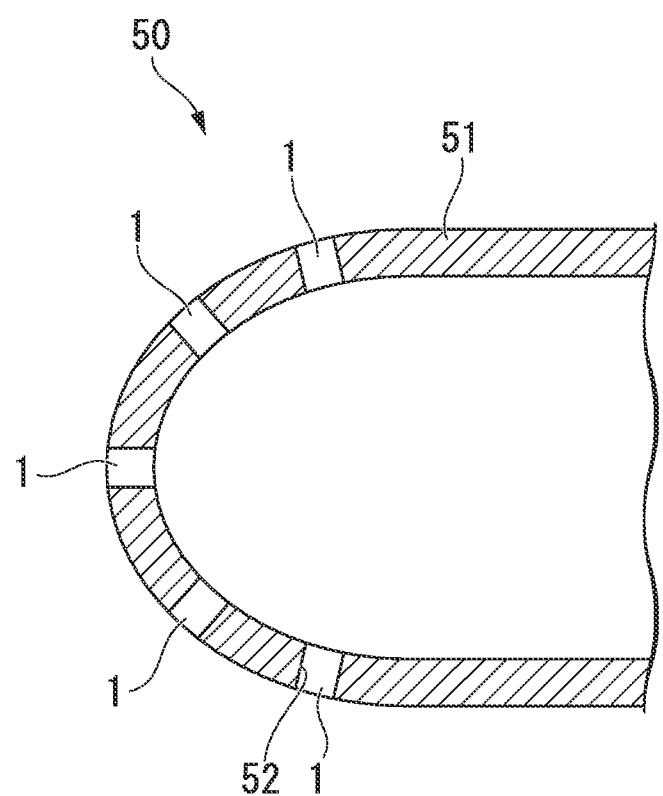
FIG. 1 is a schematic cross-sectional view showing a tip portion of a flying object to which a heat flux sensor of an embodiment of the present invention is attached.

As shown in FIG. 1, a heat flux sensor 1 according to the embodiment of the present invention is a sensor that is attached to the vicinity of a tip of a flying object shroud 51 that is an outer shell of a flying object 50 that is an object to be measured, and measures heat flux to the flying object shroud 51. The heat flux sensor 1 is equipped with a plurality of thermocouples in order to measure the temperature of the wall of the flying object shroud 51. In addition, although attached to a plurality of desired spots, the number of sensors is not particular limited.

Hole portions 52 having a circular cross-section are formed in measurement spots of the surface of the flying object shroud 51, and the heat flux sensors 1 are attached to the hole portions 52.

Each heat flux sensor 1 is formed in a columnar shape, and the hole diameter of each hole portion 52 is set to a dimension such that a predetermined gap is formed between an inner circumferential face of the hole portion 52 and an outer circumferential face 6 of the heat flux sensor 1 that faces this inner circumferential face.

Additionally, the hole portion 52 of the flying object shroud 51 is formed such that a central axis C of the heat flux sensor 1 (refer to FIG. 2) is orthogonal to the surface of an attachment spot of the flying object shroud 51.

Figure 2:
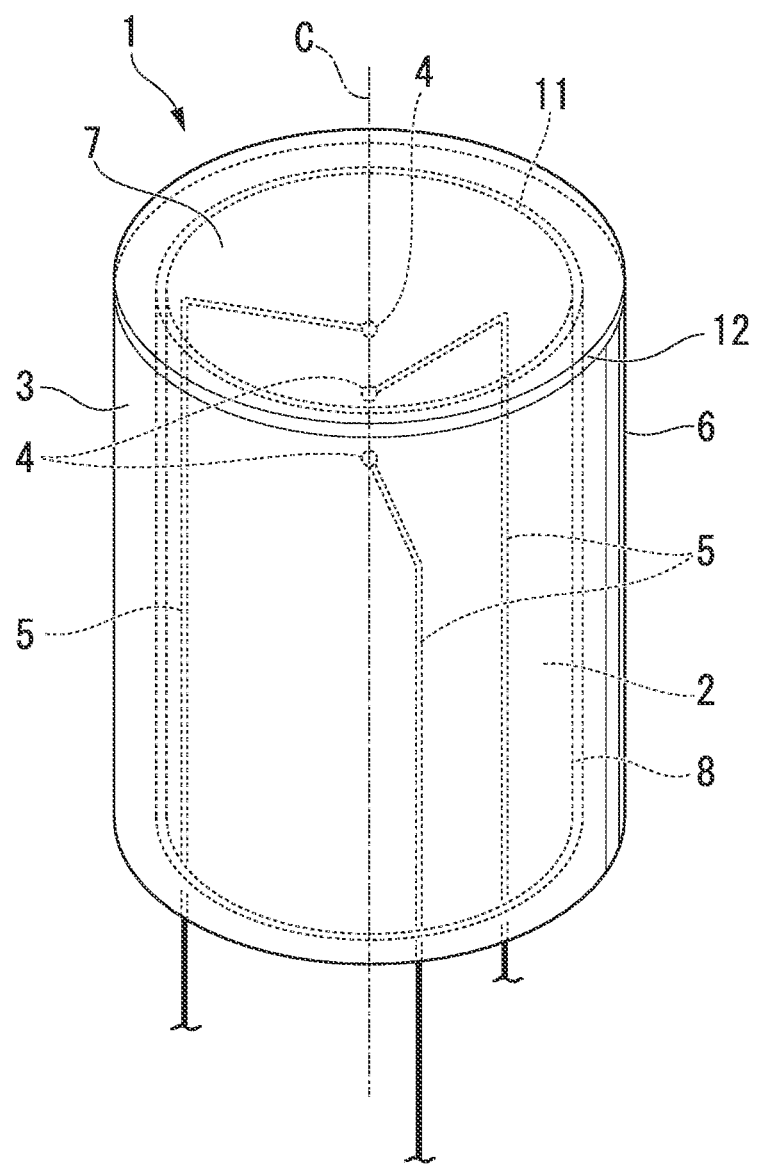
FIG. 2 is a perspective view showing the heat flux sensor of the embodiment of the present invention.
Figure 3:
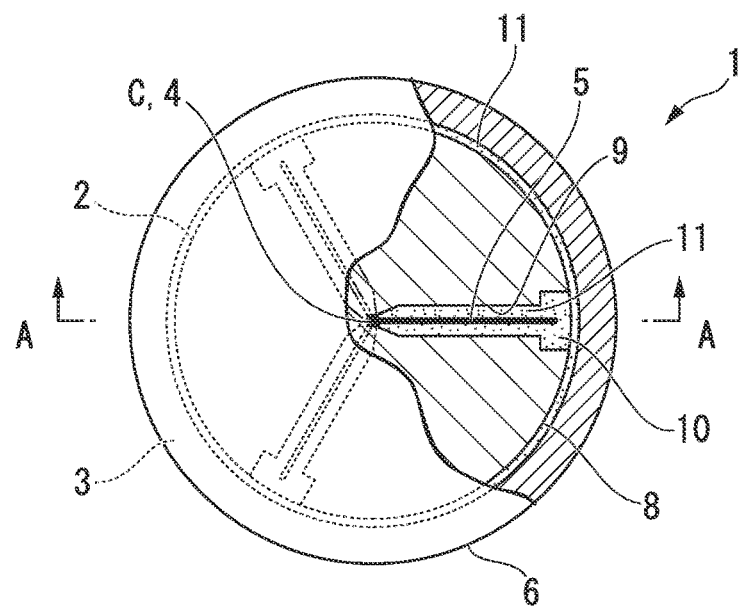
FIG. 3 is a top view showing the heat flux sensor of the embodiment of the present invention.
Figure 4:
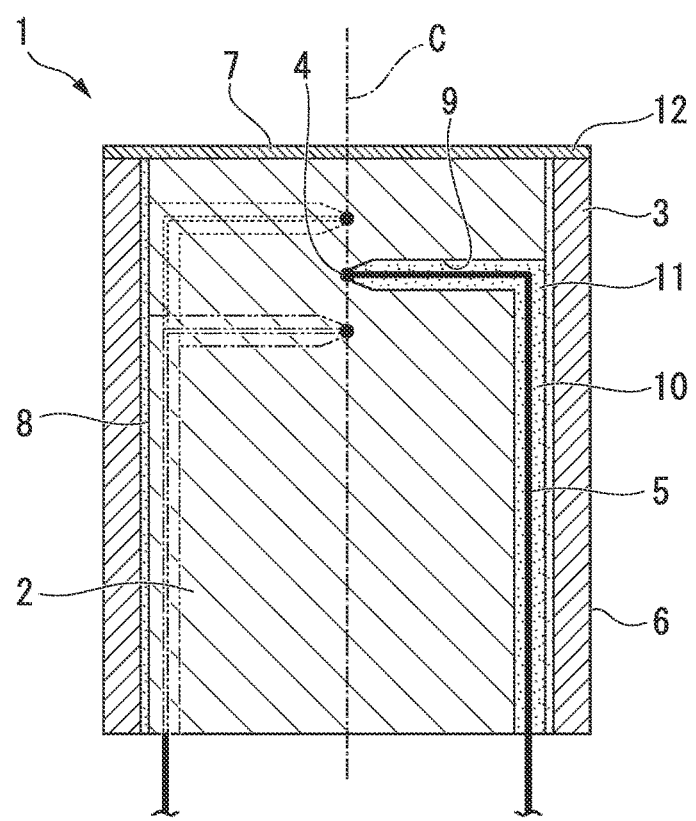
FIG. 4 is a view taken along line A-A of FIG. 3.

As shown in FIGS. 2, 3, and 4, the heat flux sensor 1 has a columnar body portion 2, a cylindrical pipe portion 3 formed so as to be mounted on a body portion outer circumferential face 8 (outer face) of the body portion 2, and a plurality of heat sensors 4 having the wiring lines 5. Each heat sensor 4 is fixed to the inside of the body portion 2, and each wiring line 5 extends from an end portion opposite to an exterior end face 7 of the heat flux sensor 1.

The axial length of the body portion 2 is made substantially equal to the thickness of the flying object shroud 51 that is the object to be measured, and the exterior end face 7 that is an end face in a first direction in the axial direction becomes flush with the surface of the flying object shroud 51 when the heat flux sensor is attached to the hole portion 52 of the flying object shroud 51. That is, the heat flux sensor 1 is attached so as to be brought into a flat state without any step between the exterior end face 7 of the heat flux sensor 1 and the flying object shroud 51 in an attachment spot thereof.

The pipe portion 3 is also similarly formed such that the axial length thereof is substantially equal to the thickness of the flying object shroud 51 that is the object to be measured, and is formed with a dimension such that a predetermined gap is formed between the body portion outer circumferential face 8 of the body portion 2 and the inner circumferential face of the pipe portion 3. Additionally, an outer circumferential face of the pipe portion 3 forms the outer circumferential face 6 of the heat flux sensor 1.

Additionally, the body portion 2 and the pipe portion 3 are formed of the same material as the flying object shroud 51, for example, stainless steel.

The body portion 2 is formed with three bored holes 9 that extend from the body portion outer circumferential face 8 of the body portion 2 toward the central axis C of the body portion 2 and has different distances from the exterior end face 7. Each bored hole 9 is a hole diameter suitable for allowing the wiring line 5 of the heat sensor 4 to pass therethrough. The respective bored holes 9 are formed from the body portion outer circumferential face 8 of the body portion 2 to the central axis C of the body portion 2, and are formed at equal intervals as seen in the axial direction. Specifically, each bored hole 9 is formed so that the tip thereof is arranged at the central axis C of the body portion 2. In other words, the tips of the respective bored holes 9 are arranged on the same normal line of the exterior end face 7. Additionally, the heat sensor 4 to be described below is arranged at the tip of the bored hole 9 so as to abut against the tip.

Additionally, the distance of the heat sensor 4 from the exterior end face 7 is set to a position that is optimal in order to measure heat flux, for example, is set to the vicinity of the exterior end face 7, and the axial positions of the respective bored holes 9 correspond to the positions of the heat sensors 4.

Additionally, the body portion outer circumferential face 8 of the body portion 2 is formed with a plurality of streak grooves 10 for allowing the wiring lines 5 of the respective heat sensors 4 to be embedded therein. Each streak groove 10 extends from an outer-circumferential-side end portion of the bored hole 9 in a second direction (opposite to the exterior end face 7) that is opposite to the first direction in the axial direction.

The heat sensor 4 is a sheathed thermocouple formed as the wiring line 5 by enclosing a thermocouple element wire in a metal protective tube (sheath). The heat sensor 4 is attached so as to abut against the tip of the bored hole 9 at a hot junction. That is, the hot junction that is a tip of the heat sensor 4 is arranged on the central axis C of the body portion 2 by the tip of the bored hole 9 being arranged at the central axis of the body portion 2 of the heat flux sensor 1.

The wiring line 5 is stretched so as to extend from the second direction side in the axial direction of the body portion 2 via the bored hole 9 and the streak groove 10, and is connected to a predetermined measuring instrument.

Additionally, the bored hole 9 is filled with nickel wax 11 serving as a filling material. The nickel wax 11 embeds the bored hole 9 so that a gap is not formed as much as possible, that is, the wiring line 5 of the heat sensor 4 laid in the bored hole 9 is sealed with the nickel wax 11.

Similarly, the wiring line 5 arranged in the streak groove 10 is also fixed with the nickel wax 11. The nickel wax 11 applied to the streak groove 10 also embeds the streak groove 10 so that a gap is not formed as much as possible. The nickel wax 11 filled in the streak groove 10 is machined so as to become flush with the body portion outer circumferential face 8 of the body portion 2. That is, the heat flux sensor is formed so as to be brought into a flat state without any step between the body portion outer circumferential face 8 of the body portion 2 and the filling material using the nickel wax 11.

The pipe portion 3 has the heat sensors 4 wired therein, and is arranged so as to cover the body portion 2 in a state where the heat sensors are fixed with the nickel wax 11. A predetermined gap between the body portion 2 and the pipe portion 3 is filled with the nickel wax 11.

Additionally, an oxide film 12 is formed on the exterior end face 7 of the heat flux sensor 1 and the face of the pipe portion 3 in the first direction in the axial direction.

The heat flux sensors 1 having the configuration as mentioned above are attached to the hole portions 52 formed in the desired measurement spots in the flying object shroud 51. In that case, a gap between the heat flux sensor 1 and the hole portion 52 is filled with a filling material consisting of the nickel wax 11.

In addition, in the above-described embodiment, the wax consisting of nickel is adopted as a filling material that fills the respective spots. However, the filling material is not limited to this. Arbitrary materials that make errors resulting from the gaps as small as possible and are suitable for filling work may be used.

Next, a method for calculating heat flux using the heat flux sensor 1 of the present embodiment will be described.

Figure 5:
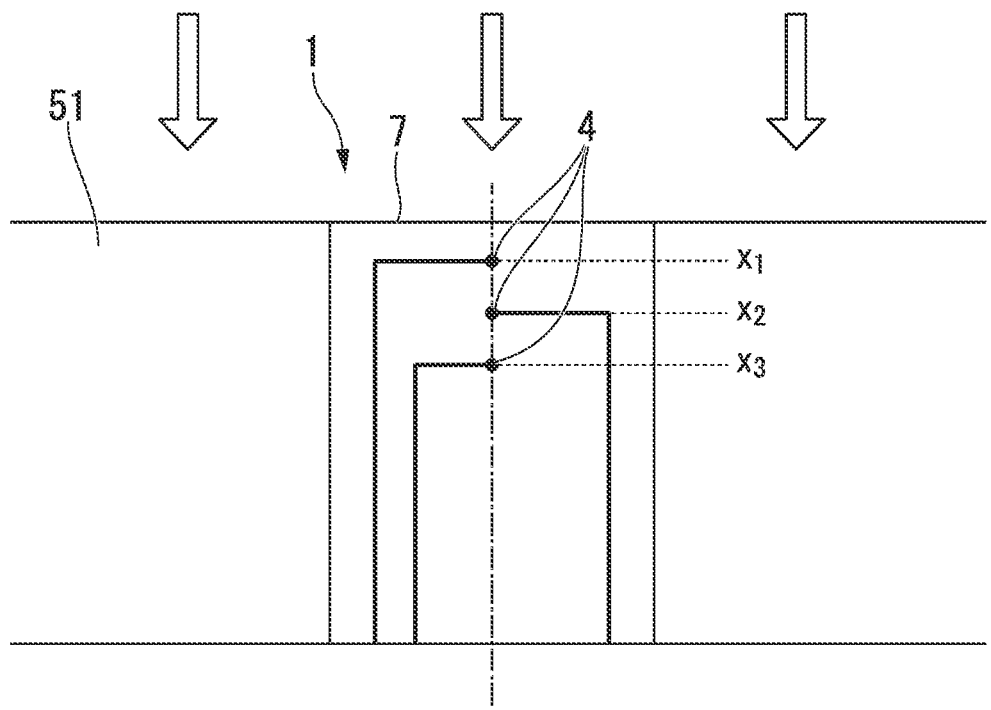
FIG. 5 is a schematic view showing a method for calculating heat flux using the heat flux sensor of the embodiment of the present invention.

As shown in FIG. 5, three temperature setting points are set in the heat flux sensor 1 of the present embodiment, and the hot junctions of the heat sensors 4 are arranged at these three temperature setting points. The temperature setting points, that is, distances x of the heat sensors 4 from the exterior end face 7 are defined as x1, x2, and x3.

[1] First, temperatures T(x1), T(x2), and T(x3) of the respective points are measured by the heat sensors 4.

[2] Next, the relational expression between the distances x from the exterior end face 7 and the temperatures T is derived by regression analysis using the measured temperatures T. That is, coefficients a, b, and c of the following Expression (1) are derived. Since the temperature setting points are three points in the present embodiment, the relational expression becomes a quadratic equation.

$$T(x)=ax^2+bx+c \quad (1)$$

[3] Next, the thermal conductivity in the exterior end face x=0, that is, the surface thermal conductivity λ is calculated from Expression (1). That is, the surface thermal conductivity λ is calculated from the surface temperature T(0)=c.

[4] Similarly, the temperature gradient in the exterior end face x=0, that is, the surface temperature gradient is calculated from Expression (1). That is, the surface temperature gradient dT/dx in the exterior end face x=0 becomes dT/dx=b.

[5] Heat flux q in the exterior end face x=0 is calculated from the relational expression of heat flux q=λ·dT/dx, and the above [3] and [4].

The heat flux q calculated by the process as shown above can be calculated by a calculation unit (computer) mounted on measurement hardware connected to the heat flux sensor 1.

Next, a method for manufacturing the heat flux sensor 1 of the present embodiment will be described.

First, the basic dimensions of the heat flux sensor 1 are set. The axial length of the heat flux sensor 1 that forms a columnar shape is set to be equal to the surface thickness of the flying object shroud 51 that is the object to be measured. Next, the diameter of the body portion 2 of the heat flux sensor 1 and the wall thickness of the pipe portion 3 are set.

Next, the flying object shroud 51 that is the object to be measured is formed with the hole portion 52 that is slightly greater than the diameter of the heat flux sensor 1 that forms a columnar shape. In this case, the hole portion 52 is formed so that the central axis of the hole portion 52 is orthogonal to the surface of the flying object shroud 51.

Next, the bored holes 9 and the streak grooves 10 are formed in the body portion 2. Each bored hole 9 is formed by performing boring, for example using a drill in the direction orthogonal to the central axis C of the body portion 2 from the body portion outer circumferential face 8 of the body portion 2. In the present embodiment, three bored holes 9 are formed corresponding to three heat sensors 4. In this case, the bored holes 9 are formed so that there are equal intervals between the circumferential position of the boreholes thereof in the circumferential direction. That is, when the three bored holes 9 are formed, the bored holes 9 are formed at intervals of 180°. Additionally, each bored hole 9 is formed so that the tip thereof coincides with the central axis C of the body portion 2.

Each streak groove 10 is formed by performing machining, for example, using a milling machine from the outer-circumferential-side end portion of the bored hole 9 toward the second direction side in the axial direction of the body portion 2 of the heat flux sensor 1.

Next, each heat sensor 4 is inserted into the bored hole 9. In this case, insertion of the heat sensor 4 is performed until the heat sensor abuts against the tip of the bored hole 9. Then, the bored hole 9 is filled and sealed with the nickel wax 11 in a state where the heat sensor 4 abuts against the tip of the bored hole 9. In this case, the inside of the bored hole 9 is filled with the nickel wax 11 so that a gap is not generated.

Moreover, the wiring line 5 exposed from the outer-circumferential-side end portion of the bored hole 9 is made to run along the inside of the streak groove 10, and the wiring line 5 is fixed with the nickel wax 11. In this case, additional machining is done so that the nickel wax 11 filled in the streak groove 10 becomes flush with the body portion outer circumferential face 8 of the body portion 2. That is, the nickel wax 11 is cut so that the nickel wax 11 filled in the streak groove 10 and the pipe portion 3 do not interfere with each other.

Next, the pipe portion 3 is attached so as to cover the body portion 2 to which the heat sensor 4 is attached, and the gap between the body portion 2 and the pipe portion 3 is filled with the nickel wax 11. Even in this case, the filling is sufficiently performed so that a gap is not provided between the body portion 2 and the pipe portion 3.

Next, the oxide film 12 is formed on the exterior end face 7 of the heat flux sensor 1. The oxide film 12 is formed by being exposed to the same conditions as the ambient temperature at which the body portion 2 to which the pipe portion 3 is attached is housed.

Finally, the heat flux sensor 1 is inserted into the hole portion 52 of the flying object shroud 51, and a gap between the outer circumferential face 6 of the heat flux sensor 1 and the inner circumferential face of the hole portion 52 is filled with the nickel wax 11.

According to the above embodiment, since a configuration is provided in which the heat sensor 4 is arranged in the bored hole 9 formed in advance and the heat sensor 4 is filled with a filling material consisting of the nickel wax 11, occurrence of a heat flux error caused by thermometer-side positional deviation can be prevented. Additionally, since the position of the heat sensor 4 can be determined depending on the depth of the bored hole 9, positioning of the heat sensor 4 becomes easy.

Additionally, since a configuration is provided in which the body portion 2 fixed to the plurality of heat sensors 4 is attached to the hole portion 52 of the object to be measured, the arrangement of the heat sensors 4 to the object to be measured becomes easy.

Additionally, when the temperature of the object to be measured is in an unsteady state, the heat flux error can be reduced by calculating heat flux depending on the temperatures of three or more points.

Additionally, since a temperature difference between the body portion 2 and the object to be measured becomes smaller by the gap between the outer circumferential face 6 of the heat flux sensor 1 and the inner circumferential face of the hole portion 52 being filled with the nickel wax 11, the heat flux error can be reduced.

Additionally, since balance in the circumferential direction in the internal structure of the body portion 2 is improved by the bored holes 9 of the body portion 2 being provided at equal intervals in the circumferential direction of the body portion 2, the heat flux error can be further reduced.

Additionally, since the streak grooves 10 for the wiring lines 5 formed in the body portion outer circumferential face 8 of the body portion 2 are covered with the pipe portion 3 by providing the pipe portion 3 so as to cover the body portion outer circumferential face 8 of the body portion 2, the attachment of the body portion 2 to the object to be measured is easy.

Additionally, by making the material of the body portion 2 and the pipe portion 3 the same as that of the object to be measured, error influence caused by the heat conduction between the object to be measured, and the body portion 2 and the pipe portion 3 can be reduced.

Additionally, since the state of the exterior end face 7 has the same state as the surface of the object to be measured by the oxide film 12 being formed on the exterior end face 7 of the heat flux sensor 1, the heat flux error can be further reduced.

In addition, the technical scope of the invention is not limited to the above-described embodiment, and various changes can be made to the above-described embodiment without departing from the scope of the invention. That is, the configuration mentioned in the above-described embodiment is merely an example, and can be appropriately changed.

For example, although a configuration in which the bored holes 9 are formed from the body portion outer circumferential face 8 of the body portion 2 has been described in the above embodiment, the bored holes 9 may be formed from other than the exterior end face 7 of the body portion 2, and a configuration in which the bored holes are formed from an end face opposite to the exterior end face 7 of the body portion 2.

Additionally, although an example in which the bored holes 9 are formed at equal intervals in the circumferential direction as seen in the axial direction has been shown, the present invention is not limited to this. The intervals of the bored holes 9 in the circumferential direction may be made unequal, or the bored holes may be formed at the same position as seen in the axial direction.

Additionally, the number of the heat sensors 4 is not limited to three, and may be two or may be four or more. If the number of the heat sensors is four or more, the precision of the calculation expression of the temperatures of thermometer-side points are improved, which is more preferable.

Additionally, in the above embodiment, the streak grooves 10 are formed in the main body. However, the streak grooves may be formed on the pipe portion 3 side.

Additionally, although the heat flux sensor 1 is formed in a columnar shape from the viewpoint of easiness of manufacture, it is also more possible to adopt polygonal shapes or the like. Moreover, the heat flux sensor 1 may be constituted of only the body portion 2 without using the pipe portion 3.

INDUSTRIAL APPLICABILITY

The present invention can be applied to the heat flux sensor attached to the hole portion formed in the surface of the object to be measured, and can prevent occurrence of the heat flux error caused by thermometer-side positional deviation.

REFERENCE SIGNS LIST

1: HEAT FLUX SENSOR
2: BODY PORTION
3: PIPE PORTION
4: HEAT SENSOR
5: WIRING LINE
6: OUTER CIRCUMFERENTIAL FACE
7: EXTERIOR END FACE
8: BODY PORTION OUTER CIRCUMFERENTIAL FACE (OUTER FACE)
9: BORED HOLE
10: STREAK GROOVE
11: NICKEL WAX
50: FLYING OBJECT
51: FLYING OBJECT SHROUD
52: HOLE PORTION

The invention claimed is:
1. A heat flux sensor capable of being attached to a hole portion defined in a surface of an object to be measured, the heat flux sensor comprising:

a body portion having an outer circumferential face, and an exterior end face that is flush with the surface of the object to be measured, wherein the body portion includes a plurality of bored holes extending from the outer circumferential face of the body portion to a central axis of the body portion;

wherein the heat flux sensor further comprises:

a plurality of heat sensors arranged so as to abut against tips of the respective bored holes and having respective wiring lines leading to an outer face of the body portion through the respective bored holes;

a filling material that fills the bored holes to seal the heat sensors inside the bored holes; and a cylindrical pipe portion that covers the outer circumferential face of the body portion, wherein an outer circumferential face of the cylindrical pipe portion faces an inner circumferential face of the hole portion, and wherein a gap between the body portion and the cylindrical pipe portion is filled with the filling material.

2. The heat flux sensor according to claim 1, wherein the plurality of heat sensors includes three or more heat sensors.

3. The heat flux sensor according to claim 1, wherein the body portion has a columnar shape.

4. The heat flux sensor according to claim 1, wherein a gap between the heat flux sensor and the hole portion is filled with the filling material.

5. The heat flux sensor according to claim 1, wherein the bored holes are positioned at equal intervals in a circumferential direction of the body portion.

6. The heat flux sensor according to claim 1, wherein a material of the body portion and a material of the pipe portion are the same as a material of the object to be measured.

7. The heat flux sensor according to claim 1, further comprising an oxide film on the exterior end face of the body portion.

8. A method for manufacturing a heat flux sensor, the method comprising:

forming a hole portion in a surface of an object to be measured;

forming a body portion having an outer circumferential face and an exterior end face that is flush with the surface of the object to be measured;

forming the body portion with a plurality of bored holes extending from the outer circumferential face of the body portion to a central axis of the body portion;

arranging a plurality of heat sensors so as to abut against tips of the respective bored holes and laying respective wiring lines so as to lead to an outer face of the body portion through the respective bored holes;

filling insides of the bored holes with a filling material so as to seal the heat sensors;

providing a cylindrical pipe portion so as to cover the outer circumferential face of the body portion, an outer circumferential face of the cylindrical pipe portion facing an inner circumferential face of the hole portion; and filling a gap between the body portion and the cylindrical pipe portion with the filling material.

\* \* \* \* \*